(12) United States Patent
Sagara et al.

(10) Patent No.: US 8,004,126 B2
(45) Date of Patent: Aug. 23, 2011

(54) MOLDED MOTOR AND ELECTRIC VEHICLE

(75) Inventors: Hiroaki Sagara, Kasai (JP); Kenji Taguchi, Hirakata (JP); Tetsuji Ueta, Hirakata (JP); Takeshi Nagao, Hirakata (JP); Takashi Uchino, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 9 days.

(21) Appl. No.: 12/560,234

(22) Filed: Sep. 15, 2009

(65) Prior Publication Data

US 2010/0066183 A1 Mar. 18, 2010

(30) Foreign Application Priority Data

Sep. 17, 2008 (JP) ................................. 2008-237748

(51) Int. Cl.
*H02K 1/04* (2006.01)
(52) U.S. Cl. ........................................ 310/43; 310/431
(58) Field of Classification Search ............... 310/43–45, 310/88, 412, 411, 423, 429, 422, 431; 29/596
See application file for complete search history.

(56) References Cited

U.S. PATENT DOCUMENTS

| 3,873,861 | A * | 3/1975 | Halm | 310/43 |
| 5,619,389 | A * | 4/1997 | Dunfield et al. | 360/98.07 |
| 5,644,178 | A * | 7/1997 | Halm | 310/43 |
| 7,225,525 | B2 * | 6/2007 | Yamamoto et al. | 29/596 |
| 7,786,635 | B2 * | 8/2010 | Gasser et al. | 310/89 |
| 2006/0012262 | A1 * | 1/2006 | Baba et al. | 310/217 |
| 2006/0238048 | A1 * | 10/2006 | Sesita et al. | 310/88 |
| 2009/0146516 | A1 * | 6/2009 | Yano et al. | 310/152 |

FOREIGN PATENT DOCUMENTS

JP H8-223866 A 8/1996

* cited by examiner

*Primary Examiner* — Quyen Leung
*Assistant Examiner* — Leda Pham
(74) *Attorney, Agent, or Firm* — Marvin A. Motenbocker; Mots Law, PLLC (57) ABSTRACT

A molded motor includes an annular stator formed by molding coils in resin, a rotor disposed in an internal space which is formed radially inside the stator, a cover covering the internal space, and an elastic member sandwiched between the cover and the stator and located at a more inner side in the radial direction of the stator from the coils.

9 Claims, 7 Drawing Sheets

MOLDED MOTOR AND ELECTRIC VEHICLE

CROSS REFERENCE TO RELATED APPLICATIONS

This application claims priority based on 35 USC 119 from prior Japanese Patent Application No. P2008-237748 filed on Sep. 17, 2008, entitled "Molded Motor and Electric Vehicle", the entire contents of which are incorporated herein by reference.

BACKGROUND OF THE INVENTION

1. Field of the Invention

The invention relates to a molded motor including a stator wherein coils are molded in resin and to an electric vehicle using the molded motor.

2. Description of Related Art

A molded motor has been well known as an driving source for an electric vehicle, a washing machine and the like.

A molded motor includes a circular annular stator and a rotor disposed in an internal space defined by the stator and formed radially inside the stator. The stator is formed with teeth and coils wound around the teeth, in which the teeth and the coils are molded in a resin material. The rotor is operated to rotate about the axis of the stator.

Generally the stator and the rotor are packed in a case for the purpose of dust proofing and waterproofing (for example, Japanese Patent Application Laid-Open No. H8-223866).

SUMMARY OF THE INVENTION

In such a configuration with the stator packed in the case, the molded motor has low radiation performance. Namely, heat generated from the coils in the stator remains in the case thereby increasing the temperature of the coils. Resulting increased resistance of the coils leads to resistive losses and decreases the motor performance. If the motor has a thermal safety mechanism to prevent overheating, operating time becomes shorter.

A first aspect of the invention is a molded motor including an annular stator formed by molding the coils in a resin, a rotor provided in an internal space which is formed radially inside the stator, a cover covering the internal space, and an elastic member provided at an inner position from the coil in a radial direction of the stator and sandwiched between the cover and the stator.

A space may be provided between the cover and the stator and outside, in the radial direction, the elastic member. The space may communicate with air outside the cover.

The stator may be formed with a groove to hold the elastic member.

The cover may be formed with a projection projecting toward the internal space and extending along the inner circumferential wall of the stator, wherein the elastic member may be sandwiched between the projection of the cover and the inner circumferential wall of the stator.

The stator may include annularly disposed teeth, the coils wound around the teeth respectively, and a resin molded body molding the coils and the teeth therein.

A second aspect of the invention is an electric vehicle including a molded motor and wheel operable to be rotated by the molded motor. The molded motor includes an annular stator formed by molding coils in a resin molding material, a rotor provided in an internal space which is formed radially inside the stator, a cover covering the internal space, and an elastic member provided at an inner position from the coil in a radial direction of the stator and sandwiched between the cover and the stator.

DETAILED DESCRIPTION OF EMBODIMENT

Descriptions are provided herein below for embodiments based on the drawings. In the respective drawings referenced herein, the same constituents are designated by the same reference numerals and duplicate explanation concerning the same constituents is basically omitted. All of the drawings are provided to illustrate the respective examples only. No dimensional proportions in the drawings shall impose a restriction on the embodiments. For this reason, specific dimensions and the like should be interpreted with the following descriptions taken into consideration. In addition, the drawings include parts whose dimensional relationship and ratios are different from one drawing to another.

(Diagrammatic Configuration of the Electric Vehicle)

Figure 1:
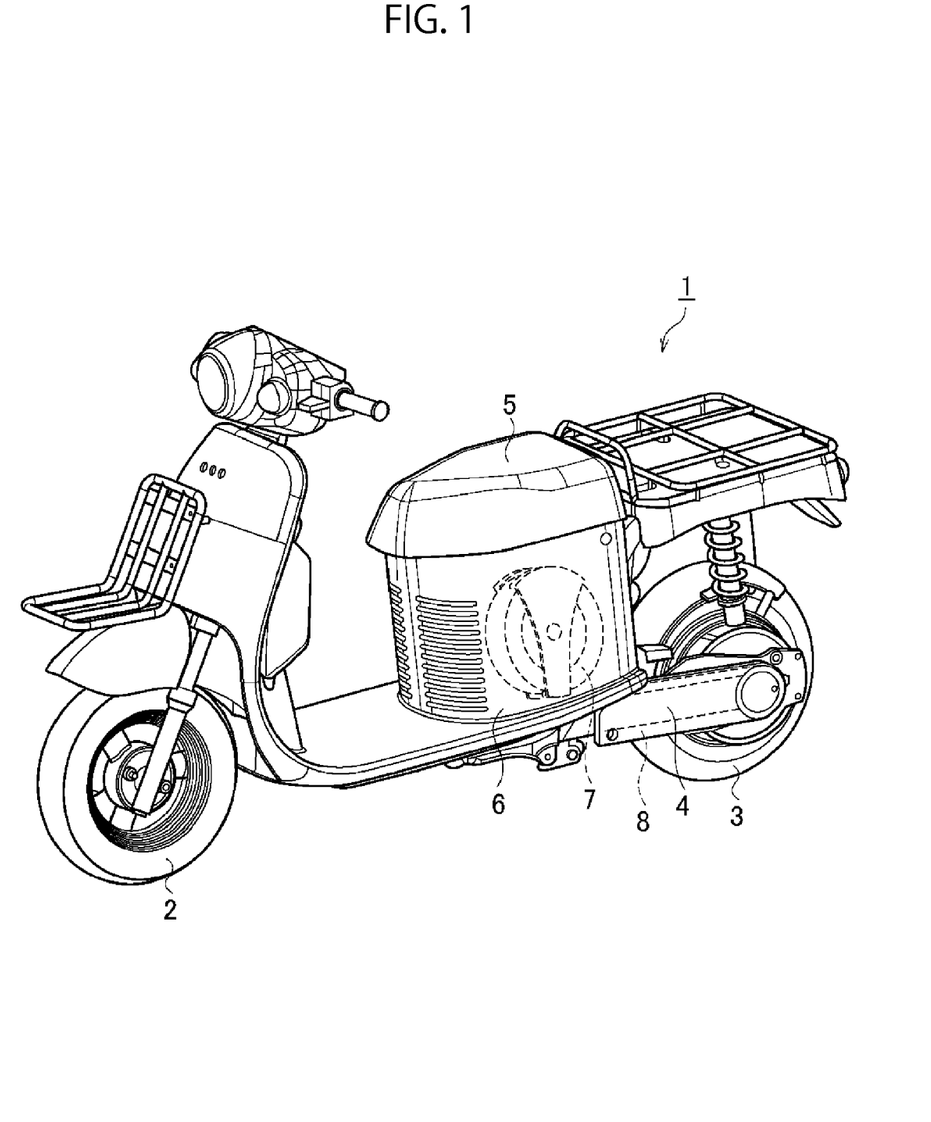
FIG. 1 is an outside view of electric motorcycle 1 according to an embodiment.

An electric vehicle using a molded motor according to an embodiment will be explained with reference to the drawings. FIG. 1 is an outside view of electric motorcycle 1 serving as an electric vehicle according to the embodiment.

As shown in FIG. 1, electric motorcycle 1 is an under-bone type motorcycle in which a body frame runs along the lower side. The electric motorcycle 1 includes front wheel 2, rear wheel 3, swing arms 4, seat 5, housing 6, molded motor 7 and power transmission unit 8.

Front wheel 2 is rotatably supported by front forks. Rear wheel 3 is rotatably supported by swing arms 4. Swing arms 4 are pivotably mounted to the body frame.

Housing 6 is provided under seat 5 on which a rider sits. Molded motor 7 of the embodiment is located in housing 6. Driving force generated by molded motor 7 is transmitted to rear wheel 3 via power transmission unit 8, so that molded motor 7 drives rear wheel 3 to rotate.

(Diagrammatic Configuration of Molded Motor)

Figure 2:
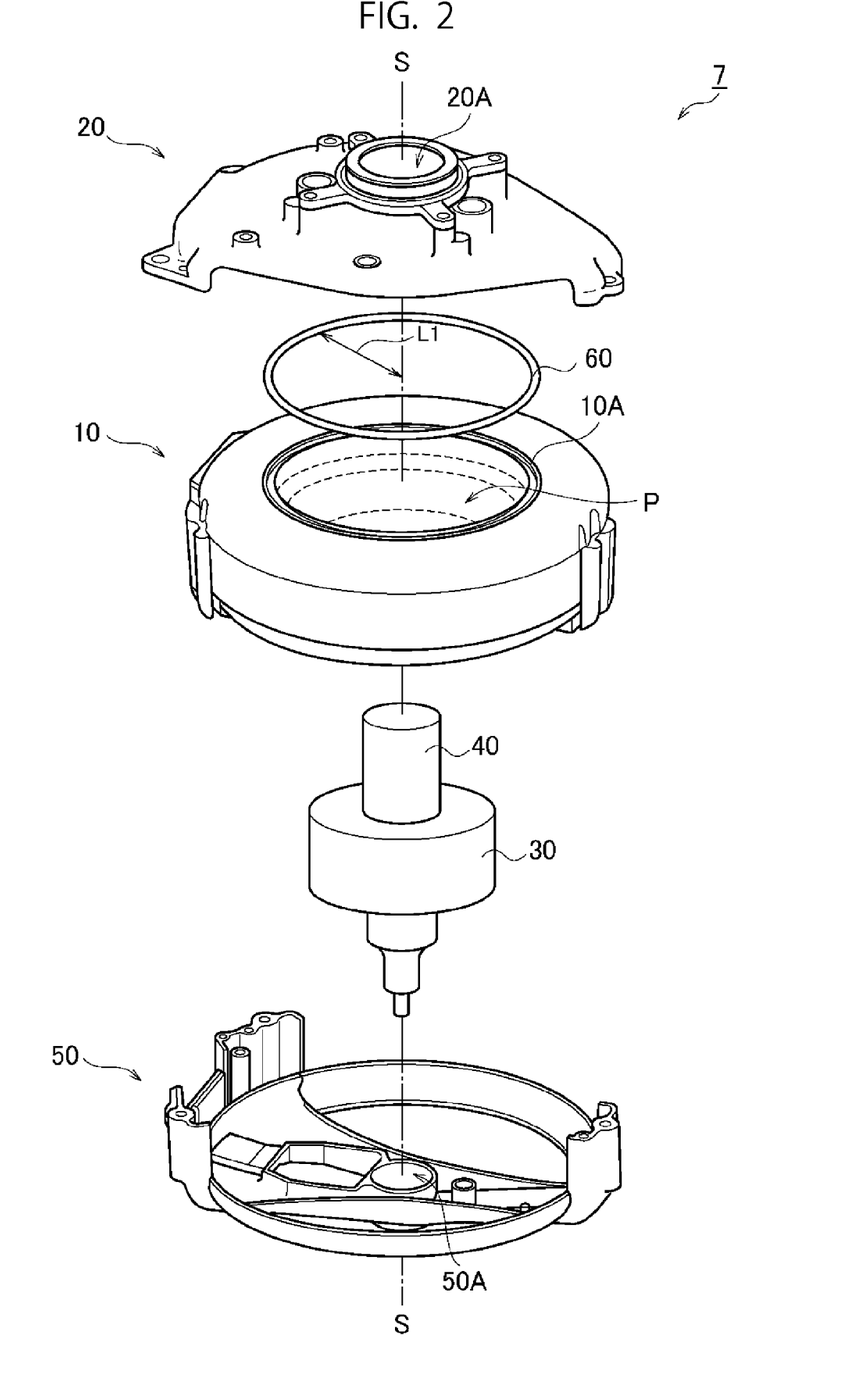
FIG. 2 is an exploded view of molded motor 7 of the embodiment according to the invention.
Figure 3:
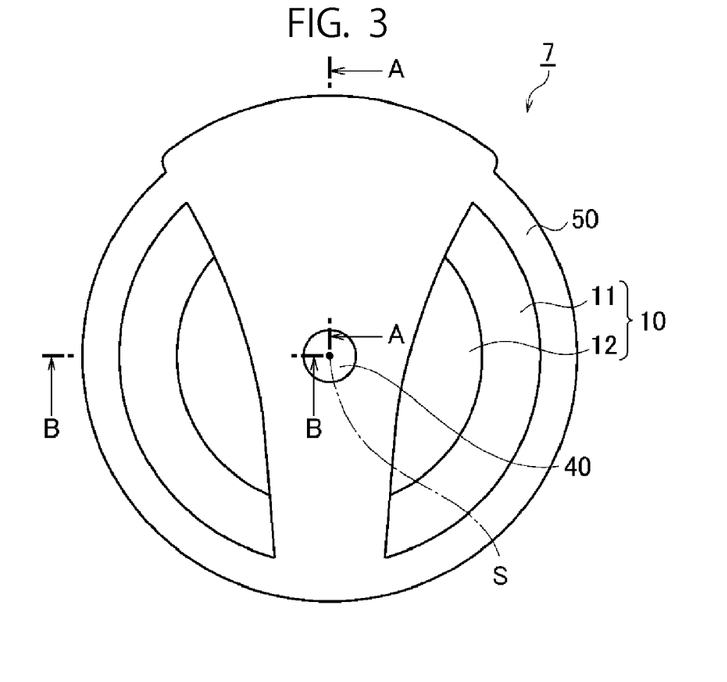
FIG. 3 is a side view of an output side of molded motor 7 as seen from the side of the output shaft of molded motor 7.
Figure 4:
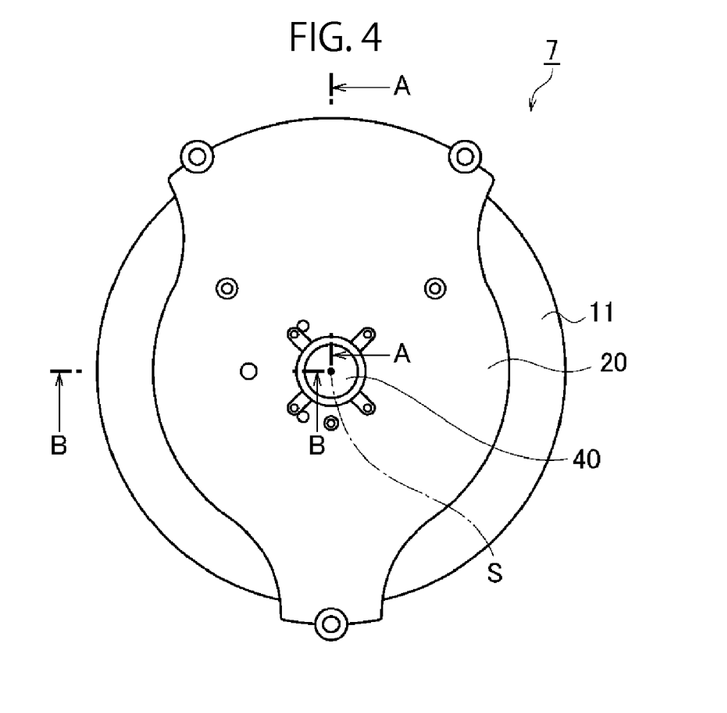
FIG. 4 is aside view of a non-output side of molded motor 7 as seen from the side opposite to the output shaft of the motor 7.

Diagrammatic configuration of the molded motor according to the embodiment will be explained with reference to the drawings. FIG. 2 is an exploded view of molded motor 7 according to the embodiment. FIG. 3 is a side view of an output side of molded motor 7. FIG. 4 is a side view of a non-output side of molded motor 7. Note that the output side means the side where output shaft 40 is connected to power transmission unit 8, and the non-output side means the side opposite to the output side.

As shown in FIG. 2, molded motor 7 includes stator 10, first cover 20, rotor 30, output shaft 40 and second cover 50.

Figure 5:
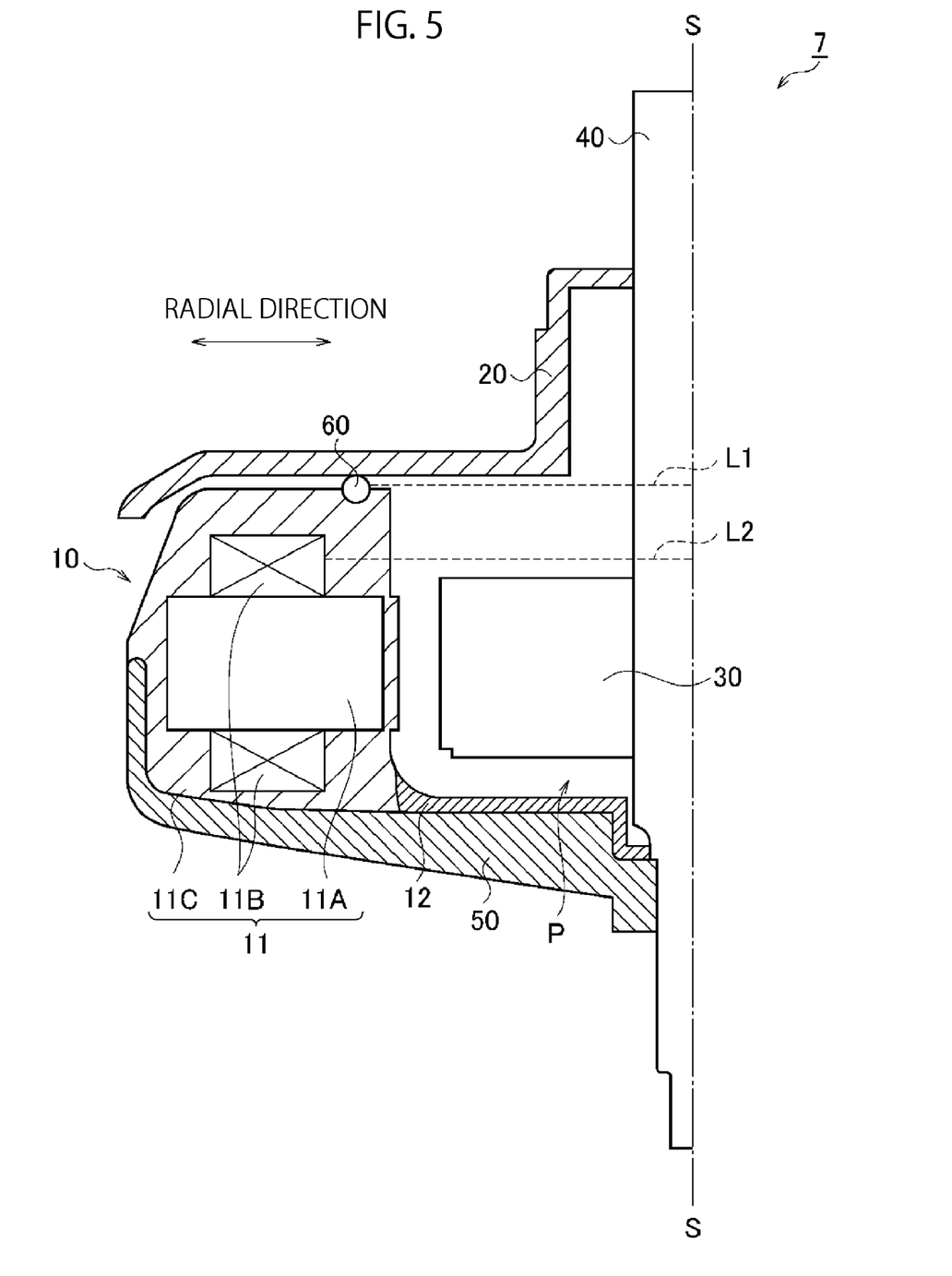
FIG. 5 is a sectional view along A-A line in FIG. 3 and FIG. 4.

Stator 10 includes, as shown in FIG. 3, stator body 11 and stator cover portion 12. Stator body 11 is formed in a circular annular shape about the axis S. Inside stator body 11, internal space P forming a circular column shape is defined by the stator body 11. Groove 10A is formed on the top face of stator body 11, forming a circular annular shape about the axis S. Referring to FIG. 5, stator body 11 is formed by molding in a resin molding material teeth 11A annularly disposed about the axis S and coils wound around the teeth. Stator cover portion 12 closes an open end of internal space P.

First cover 20 closes the other open end of internal space P. First cover 20 is formed with opening 20A through which output shaft 40 extends. First cover 20 and second cover 50 are fixed to each other by means of screws.

Rotor 30 is disposed in internal space P. Rotor 30 is operated to rotate about the axis S. Rotor 30 is fixed to output shaft 40 extending through rotor 30.

Output shaft 40 extends through rotor 30. Output shaft 40 is operated to rotate with rotor 30 about the axis S. Output shaft 40 is connected to power transmission unit 8, whose configuration is not shown in the drawings.

Second cover 50 and first cover 20 are disposed opposite to each other and sandwich stator 10 therebetween. Second cover 50 is formed with opening 50A through which output shaft 40 extends.

Elastic member 60 serving as a seal is formed in a circular annular shape having the axis S as center. Elastic member 60 is held in groove 10A. Elastic member 60 is formed, for example, by injecting a liquid gasket material into groove 10A or of circular annular rubber made to be fit in groove 10A. Elastic member 60 is sandwiched between stator 10 and first cover 20. This configuration prevents water and dust from entering into internal space P through a gap between stator 10 and first cover 20. Note that, as shown in FIG. 2, elastic member 60 has a radius of L1.

Stator 10 is partially exposed to the air outside covers 20 and 50 (that is, the air inside housing 6). Namely, as shown in FIGS. 2 to 4, first cover 20 and second cover 50 are partially connected with each other to form a cover which has an outer circumferential wall with plural windows, so that the outer circumferential portion of stator 10 is exposed to the air outside the cover (which is, the air inside housing 6).

(Detail Configuration of the Molded Motor)

Figure 6:
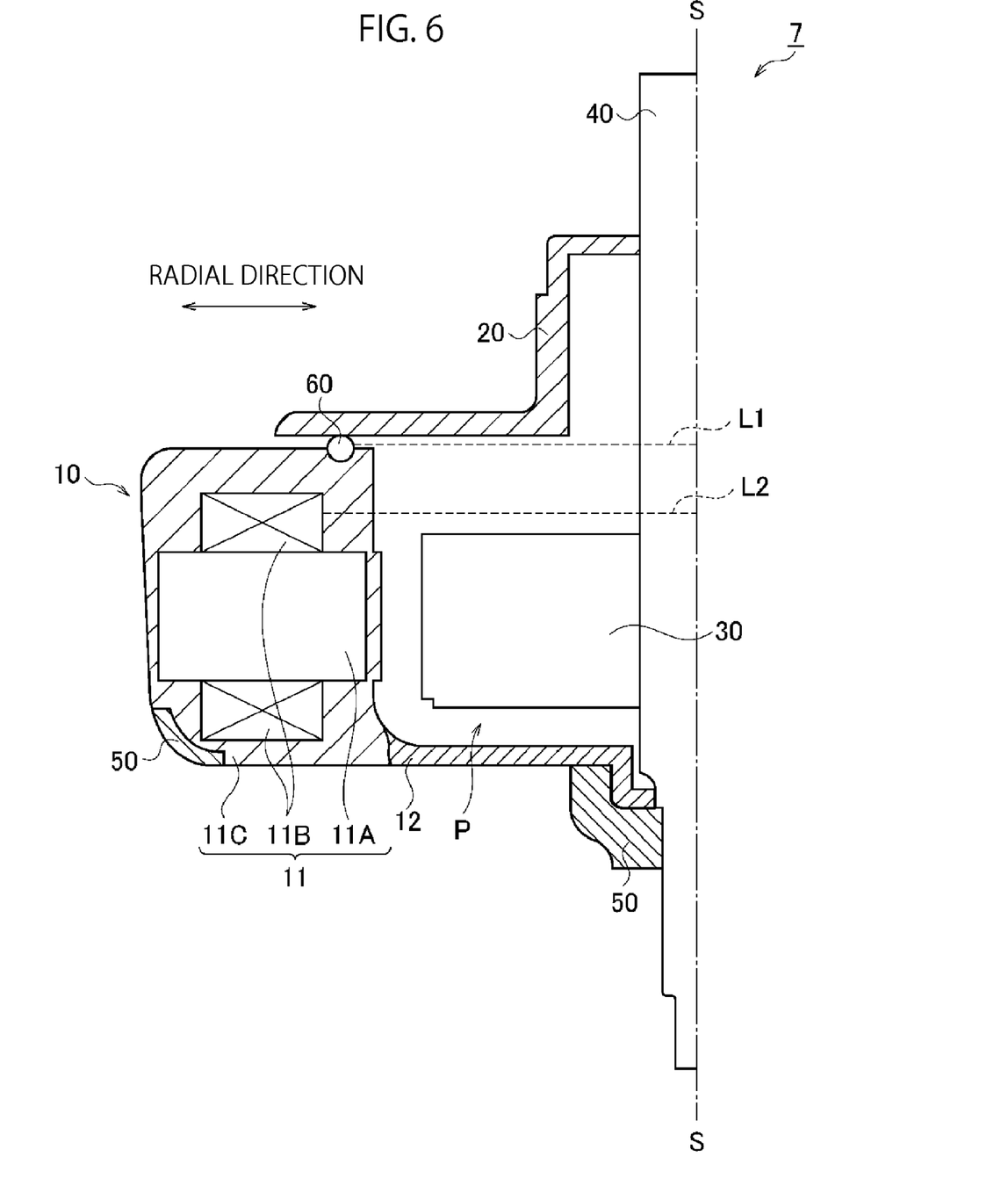
FIG. 6 is a sectional view along B-B line in FIG. 3 and FIG. 4.

The molded motor according to the embodiment will be explained in detail with reference to the drawings. FIG. 5 is a cross section taken along A-A line of FIG. 3 and FIG. 4. FIG. 6 is a cross section taken along B-B line of FIG. 3 and FIG. 4.

As shown in FIGS. 5 and 6, stator body 11 is formed of annularly disposed teeth 11A about the axis S as a center, coils 11B wound around teeth 11A respectively, and molded body 11C.

Teeth 11A are made of magnetic material (for example, magnetic steel sheet, powder metal, or the like). Each of teeth 11A extends along a substantially radial direction orthogonal to the axis S. Each of teeth 11A has an end exposed into internal space P and facing rotor 30. Note that each of teeth 11A is coated with electric insulating coating.

Coils 11B are coiled around teeth 11A, respectively. Electrified coil 11B causes rotational force (driving force) to rotate rotor 30 that faces teeth 11A, while coil 11B generates heat.

Teeth 11A and coils 11B are molded in mold body 11C. Mold body 11C is made of electrical insulating resin material such as thermosetting resin or the like. In the embodiment, stator cover portion 12 is made of the same material as that of mold body 11C and formed integrally with mold body 11C.

Radius L1 of elastic member 60 is smaller than the length L2 between the axis S and coil 11B in the radial direction. In other words, elastic member 60 is located at an inner position in the radial direction of stator 10 from coils 11B.

Figure 7:
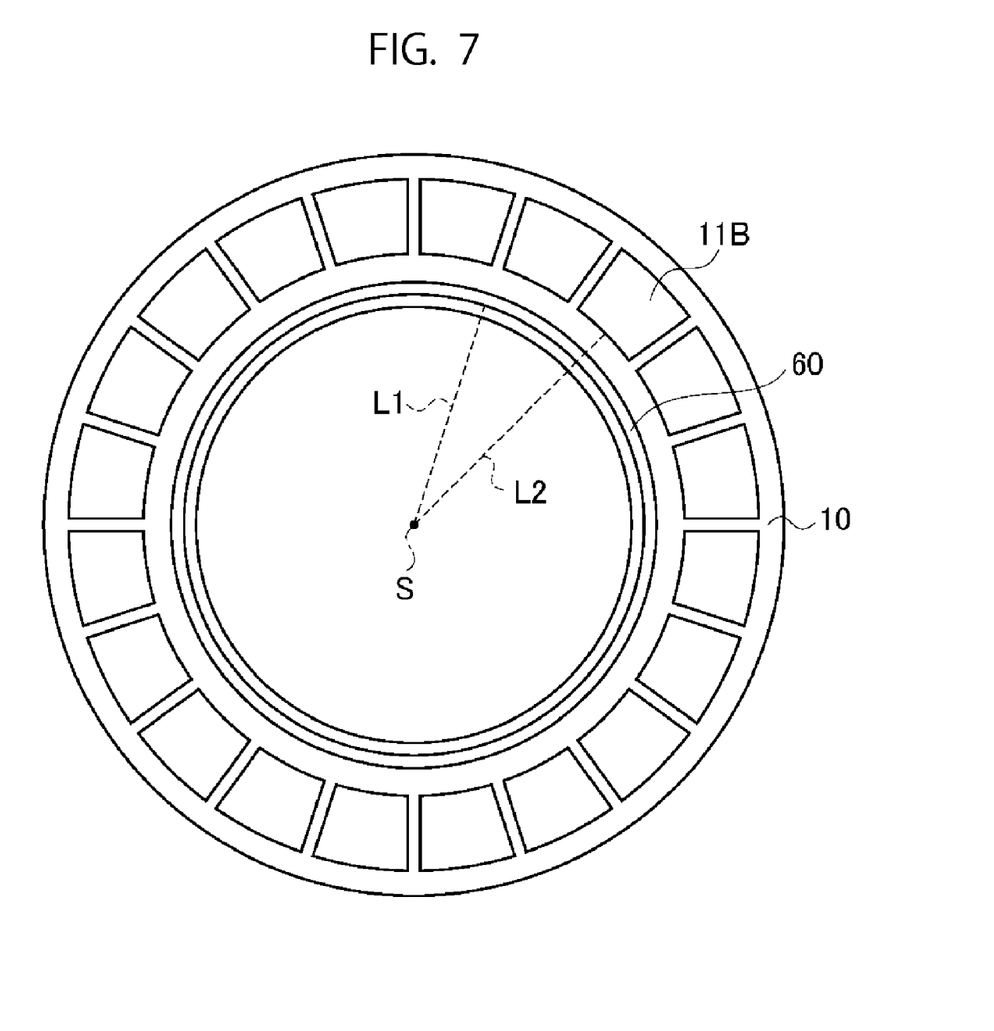
FIG. 7 is a projection view of the molded motor 7 on a plane substantially orthogonal to the axis S, seen along the axis S.

FIG. 7 is a projection view of stator 10, coils 11B, and elastic member 60 on a plane substantially perpendicular to the axis S. As shown in FIG. 7, coils 11B and elastic member 60 do not overlap with each other on the projection view. Coils 11B are disposed in a ring radially outside elastic member 60.

(Functions and Effects)

According to the embodiment, molded motor 7 includes elastic member 60 which is sandwiched between first cover 20 and stator 10 and disposed radially inside coil 11B in the radial direction of stator 10.

In other words, coils 11B are located at outer positions in the radial direction from elastic member 60 which seals inner space P of stator 10. This configuration reduces the amount of heat stays in internal space P of stator 10, while elastic member 60 serving as a sealing member prevents water, dust and the like from entering into internal space P of stator 10. Therefore, the embodiment provides a molded motor and electric vehicle with improved heat radiation performance while preventing water and dust contamination.

According to the embodiment, a space, between first cover 20 and stator 10, is formed radially outside the elastic member and the space communicates with the outside through first cover 20. This configuration allows heat radiated from coil 11B to escape away through the space to the outside. Therefore, molded motor 7 further improves its heat radiation performance.

According to the embodiment, groove 10A to hold elastic member 60 therein is formed on stator 10. Such a stator with groove 10A can be made by injecting resin material into a mold that has a projected portion corresponding to groove 10A. This improves the productivity, compared to forming an outline of first cover 20 using a pair of mold halves, and then forming a groove on the outline of first cover 20.

MODIFICATION

Figure 8:
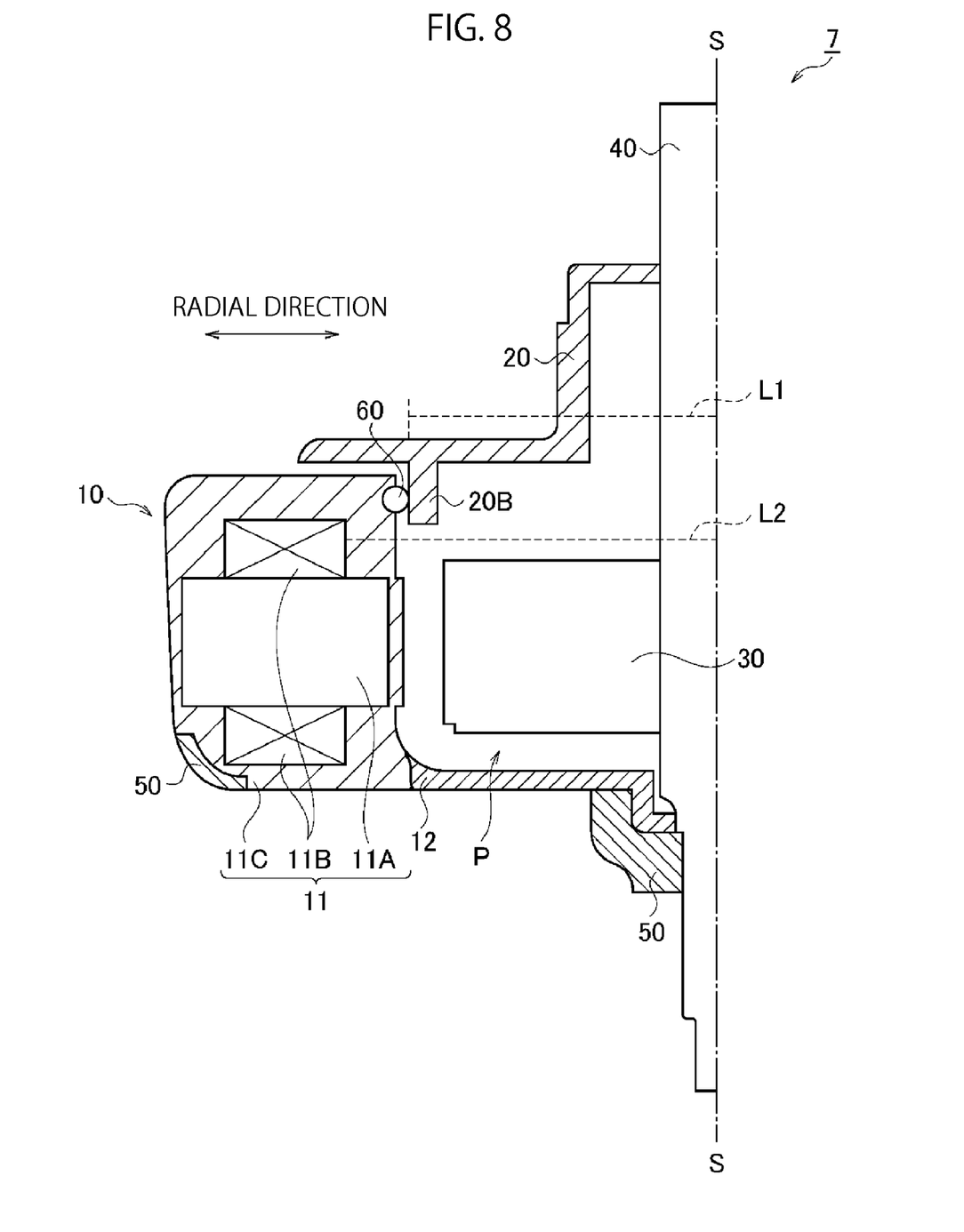
FIG. 8 is a sectional view of molded motor 7 according to a modification.

A molded motor according to a modification will be explained with reference to the drawings. FIG. 8 is a cross section of mold motor 7 according to the modification.

As shown in FIG. 8, first cover 20 is formed with tubular projection 20B which projects toward internal space P and extends along the inner circumferential wall of stator 10. In this embodiment, projection 20B is formed in a circular annular shape about the axis S as the center of projection 20B.

In this modification, groove 10A is formed on the inner circumferential wall which defines internal space P of stator 10. Elastic member 60 is thus disposed in internal space P. Elastic member 60 is sandwiched between the inner circumferential wall of stator 10 and projection 20B of first cover 20.

According to this modification, since elastic member 60 is disposed in internal space P, heat radiation performance from stator 10 further improves. According to this modification, first cover 20 and/or elastic member 60 can be formed smaller, and this reduces the production cost of molded motor 7.

Other Embodiments

Although the invention has been described above by reference to certain embodiments, the invention is not limited to the above description and figures which are a part of teachings of the invention. The invention covers other embodiments and modifications that will occur to those skilled in the art in light of the teachings of the invention.

For example, although stator 10 is formed with stator cover portion 12 in the above embodiment, stator 10 may be formed without stator cover portion 12. In this configuration, second cover 50 may cover the other opening end of internal space P.

Although groove 10A is formed on stator 10 in the above embodiment, groove 10A may be formed on first cover 20. In such a configuration where groove 10A is formed on a face of the projection 20B which opposes the inner circumferential wall of the stator 10, it becomes easier to mount elastic member 60 to groove 10A.

Although elastic member 60 of the above embodiment is provided between first cover 20 and stator 10, elastic member 60 may be provided between second cover 50 and stator 10.

Although molded motor 7 is used for electric motorcycle 1 in the above embodiment, molded motor 7 may be used for other purposes. For example, molded motor 7 may be used in a fan, a washing machine, or the like.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing descriptions. Hence, all configurations including the meaning and range within equivalent arrangements of the claims are intended to be embraced in the invention.

What is claimed is:

1. A molded motor comprising:
an annular stator formed by molding coils in resin;
a rotor disposed in an internal space which is formed radially inside the stator;
a cover covering the internal space;
an elastic member sandwiched between the cover and the stator and located at an inner position in the radial direction of the stator from the coils, and a space, between the cover and the stator, formed radially outside the elastic member and communicating with the air outside the cover.

2. The molded motor according to claim 1, wherein the stator is formed with a groove to hold the elastic member therein.

3. The molded motor according to claim 1, wherein the cover is formed with an annular projection protruding toward the internal space of the stator and extending along an inner circumferential wall of the stator, and the elastic member is sandwiched between the annular projection of the cover and the inner circumferential wall of the stator therein.

4. The molded motor according to claim 1, wherein the stator includes annularly disposed teeth, the coils coiled around the teeth respectively, and a resin mold body molding the teeth and the coils therein.

5. An electric vehicle comprising:
a wheel; and
a molded motor operable to drive the wheel to rotate, the molded motor includes:
an annular stator formed by molding coils in a resin;
a rotor disposed in an internal space which is formed radially inside the stator;
a cover covering the internal space;
an elastic member sandwiched between the cover and the stator and located at an inner position in the radial direction of the stator from the coils; and
a space, between the cover and the stator, formed radially outside the elastic member and communicating with the air outside the cover.

6. A molded motor comprising:
an annular stator formed by molding coils in a resin, the stator defining a column shaped inner space radially inside the stator, the inner space having at least one open end;
a rotor disposed in the internal space;
a cover covering the at least one open end of the internal space;
an annular sealing member extending along an edge of the at least one open end of the inner space and sandwiched between the cover and the stator so as to seal the at least one open end, the annular sealing member located at an inner position in the radial direction of the stator from the coils; and
a space, between the cover and the stator, formed radially outside the elastic member and communicating with the air outside the cover.

7. The molded motor according to claim 1, wherein the resin molding the coils therein is exposed to the space communicating with the air outside the cover.

8. The electric vehicle according to claim 5, wherein the resin molding the coils therein is exposed to the space communicating with the air outside the cover.

9. The molded motor according to claim 6, wherein the resin molding the coils therein is exposed to the space communicating with the air outside the cover.

* * * * *